(12) United States Patent
Becker et al.

(10) Patent No.: US 7,262,530 B2
(45) Date of Patent: Aug. 28, 2007

(54) MECHANICAL INTERFACED SYSTEM

(75) Inventors: Herbert Becker, Coburg (DE); Uwe Klippert, Rodental (DE); Gerhard Dumbser, Niederwerm (DE); Jurgen Seeberger, Baunach (DE); Karl-Heinz Rosenthal, Karlsbad (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 234 days.

(21) Appl. No.: 10/487,443

(22) PCT Filed: May 23, 2002

(86) PCT No.: PCT/EP02/05675

§ 371 (c)(1),
(2), (4) Date: Oct. 18, 2004

(87) PCT Pub. No.: WO03/019751

PCT Pub. Date: Mar. 6, 2003

(65) Prior Publication Data

US 2006/0232152 A1    Oct. 19, 2006

(30) Foreign Application Priority Data

Aug. 23, 2001  (DE) .............................. 101 41 244

(51) Int. Cl.
*H02K 5/22* (2006.01)
(52) U.S. Cl. ................. 310/89; 310/71; 310/75 R
(58) Field of Classification Search ............ 310/71, 310/89
See application file for complete search history.

(56) References Cited

U.S. PATENT DOCUMENTS

| 4,857,784 | A | * | 8/1989  | Mukaekubo ............. 310/68 B |
| 5,245,258 | A | * | 9/1993  | Becker et al. ............. 318/266 |
| 5,444,315 | A | * | 8/1995  | Adam et al. ................ 310/42 |
| 5,453,649 | A | * | 9/1995  | Blanchet ..................... 310/71 |
| 5,528,093 | A | * | 6/1996  | Adam et al. ................ 310/89 |
| 5,844,386 | A | * | 12/1998 | Matsuoka et al. ......... 318/293 |

(Continued)

FOREIGN PATENT DOCUMENTS

DE    198 39 333 C    1/2000

(Continued)

OTHER PUBLICATIONS

Patent Abstracts of Japan vol. 1998, No. 13, Nov. 30, 1998.

*Primary Examiner*—Burton Mullins
(74) *Attorney, Agent, or Firm*—Sughrue Mion, PLLC

(57) ABSTRACT

The present invention provides a mechanical interface apparatus (1) for a motor drive unit (2) in motor vehicles, in particular in a motor vehicle door, which is firmly connected to the drive unit (2) and has holding and guide devices (4, 6) for holding a control or plug unit (3a, 3b), with a cut-out (5), which passes all the way through, being formed between the interface apparatus (1) and the drive unit (2) in order to pass through at least one plug contact (30), a component mount (31) or the like for the control or plug unit (3a, 3b); and with at least two guide devices (8, 9) being provided in or close to the drive unit (2) for guiding the plug contacts (30) and/or the component mounts (31) or various control or plug units (3a, 3b) of this type.

15 Claims, 5 Drawing Sheets

U.S. PATENT DOCUMENTS

| | | | |
|---|---|---|---|
| 5,984,695 A * | 11/1999 | Riehl et al. ................. 439/76.1 |
| 6,107,713 A * | 8/2000 | Hulsmann et al. ......... 310/75 R |
| 6,191,512 B1 * | 2/2001 | Lekeux et al. ................. 310/89 |
| 6,201,326 B1 | 3/2001 | Klappenbach et al. |
| 6,317,332 B1 * | 11/2001 | Weber et al. ................. 361/760 |
| 6,459,183 B1 * | 10/2002 | Tasch et al. ................... 310/89 |
| 2003/0160526 A1 * | 8/2003 | Becker et al. ................. 318/66 |
| 2004/0027013 A1 * | 2/2004 | Aab et al. ................. 310/68 B |

FOREIGN PATENT DOCUMENTS

| | | |
|---|---|---|
| DE | 199 16 958 A | 10/2000 |
| JP | 3-48347 | 5/1991 |
| JP | 07-99753 | 4/1995 |
| JP | 10 255048 A | 8/1998 |
| JP | 2001-522579 | 11/2001 |
| WO | WO 01 59915 A | 8/2001 |

* cited by examiner

MECHANICAL INTERFACED SYSTEM

The invention relates to a mechanical interface apparatus for a motor drive unit in motor vehicles, in particular in a motor vehicle door.

DE 198 514 55 A1 describes a module for fitting to a drive unit which is driven by an electric motor and is provided with a connecting cap by means of which the module is attached to the drive unit. Drive units such as these are generally arranged, for example, in vehicle doors and are subject to a high acceleration force of, for example, 50 g when the door is shut. This results in the risk of modules such as these becoming detached from the drive unit when vehicle doors are shut, or of electrical and electronic contacts or sensors being moved away from their operating position, so that the drive unit becomes unserviceable.

The expression drive units for vehicle inside doors should be regarded as meaning, for example, motor drives for window winders, external mirrors, seat adjustment, door locks or the like.

DE 90 130 06 U1 discloses a system in which the drive unit and the control unit are in the form of a common unit. A drive unit such as this has the disadvantage that it can be used only for the same modules and control units, and the control units cannot be configured on the basis of a building block system since it is impossible to replace them by or to use different control units.

The invention is accordingly based on the object of providing a mechanical interface apparatus for drive units, in particular in motor vehicle doors, which is used on the basis of the building block principle to hold different connecting units, for example a control or plug unit or the like.

According to one preferred development, at least one guide device is formed by a part of the housing of the drive unit.

At least one guide device is preferably formed by the brush holder of a commutator motor which is provided in the drive unit. Contact guide devices such as these which are fixed to the drive ensure stable positioning of corresponding components.

According to a further preferred development, the guide device is rigid.

In another embodiment, at least one contact guide device is formed by guide elements which are provided within the drive unit. In consequence, the plug contacts, holding sections, electrical conductors or the like, of the plug or control unit, which are inserted through a cut-out are passed to a predetermined stable operating position and are held in this state even when lateral forces occur.

The guide elements are preferably each arranged in pairs parallel to the holding direction, with the pairs of guide elements having different guide heights. It is thus also possible to distinguish between the different electronic units by the mechanical interfaces.

According to a further preferred embodiment, the component mount is flexible.

In a further embodiment, the holding section of the plug or control unit comprises a finger of a printed circuit board, of a stamped grid, of a lead frame, of a part of an MID base or the like, on which components, such as a sensor; electronics with an integrated sensor, in particular a Hall sensor suppression components such as an inductor or a capacitor; a single-chip micro controller with an integrated Hall sensor or the like are arranged. The use of correspondingly associated rigid guide devices to guide the finger means that the corresponding components are kept in a predetermined, stable operating state, and are held in this state in a stable manner, corresponding to their functionality.

The plug or control unit preferably engages in an interlocking manner with the cut-out in the operating state. The individual electrical or electromechanical components in the interior of the drive unit are thus protected against external influences, for example dirt particles.

In one preferred development, at least one sealing device, in particular a sealing ring or a multistage laminate seal, is provided between the cut-out and the housing of the control or plug unit. The electrical components are thus also protected against moisture. The overall arrangement can thus be used not only in a dry area but also in a wet area, in the latter case together with the sealing device that has been mentioned.

DRAWINGS

Exemplary embodiments of the invention will be explained in more detail in the following description and are illustrated in the drawings, in which.

DESCRIPTION OF THE EXEMPLARY EMBODIMENTS

Identical reference symbols denote the same or functionally identical components in the figures.

Figure 1:
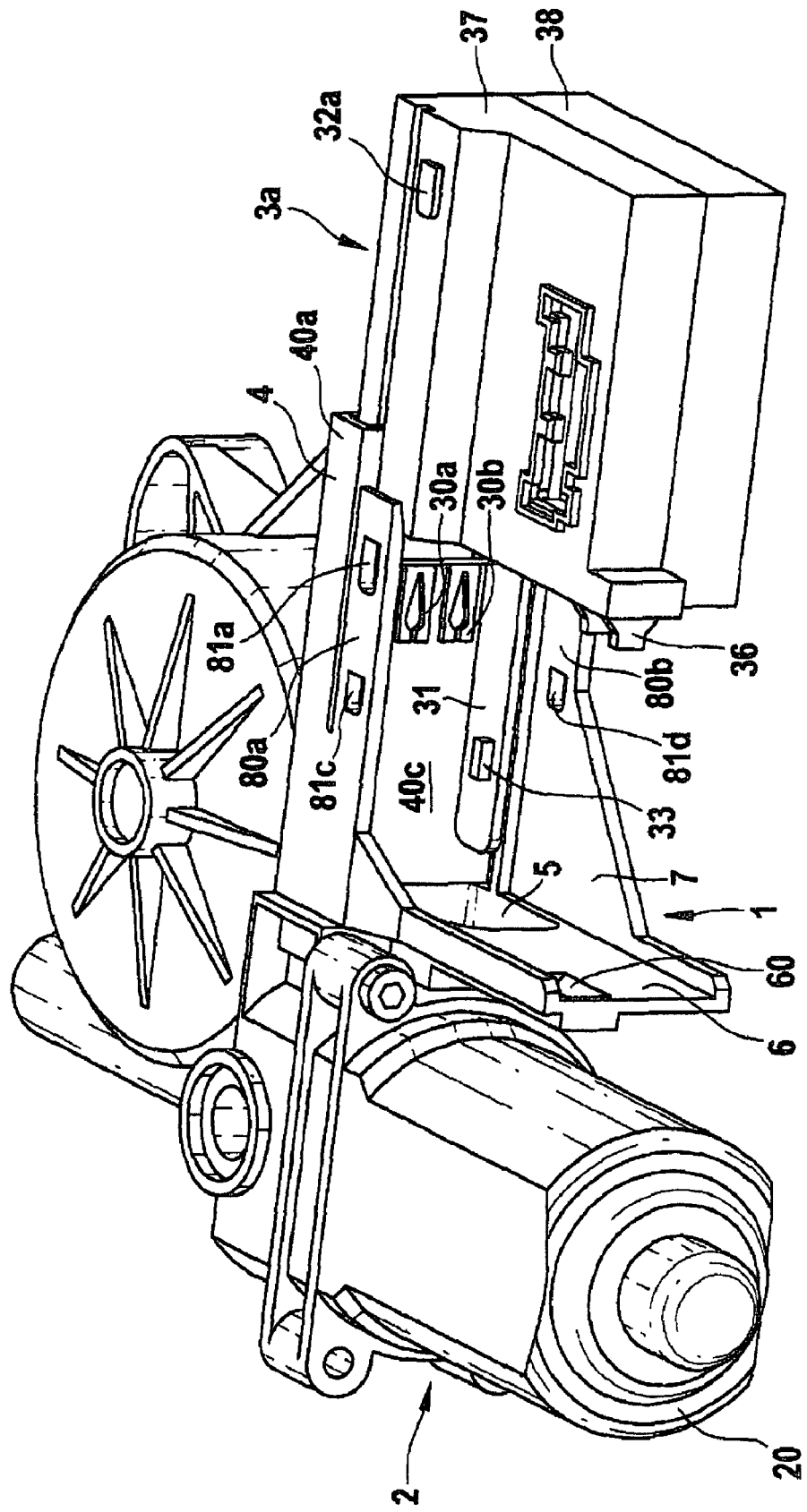
FIG. 1 shows a perspective view of an interface apparatus according to one exemplary embodiment of the present invention, with a control unit partially inserted.

FIG. 1 illustrates a perspective view of a motor drive unit 2 with a commutator motor 20. At this point, it should be noted that the commutator motor 20 has been omitted from the following figures, in order to illustrate the interior of the drive unit 2 better.

An interface apparatus 1 with holding and guide devices 4, 6 is fitted to the drive unit 2. A control unit 3a is firmly connected to the drive unit 2, and is mounted in a stable manner in an operating state, by means of the mechanical interface apparatus 1.

The mechanical interface apparatus 1 has a guide device 4 which preferably comprises two robust guide rails 40a, 40b, which are arranged opposite one another and are connected to one another by means of a robust connecting plate 40c.

The interface apparatus 1 furthermore has a latching device which, according to the present exemplary embodiment, has two locking tongues 80a, 80b. The locking tongues 80a, 80b are arranged parallel to a respective guide rail 40a, 40b of the guide device 4 and have two or more, for example in each case two, latching openings 81a, 81c and 81b, 81d, respectively, which are arranged one behind the other in the holding direction. Furthermore, the locking tongues 80a, 80b of the latching device are mounted, for example on one side, on the guide device 4 and are formed integrally with it. The free ends of the locking tongues 80a, 80b advantageously point away from the drive unit 2. The two locking tongues 80a, 80b thus form a flexible or resilient insertion area.

The mechanical interface apparatus 1 furthermore has a bearing device 6, which is preferably arranged at right angles to the guide device 4 and to the locking tongues 80a, 80b and is integrally formed on them. The bearing device 6 comprises a section which is in the form of a plate and in which the cut-out 5 is provided for the printed circuit board tongue 31 to pass through and for electrical contact tongues of the control unit 3a to pass through. In addition, the section which is in the form of a plate has at least one opening 60, into which projections 36 on the control unit 3a can engage, in order to provide additional robustness and locking.

Reinforcements which run laterally and are preferably in the form of limbs are integrally formed between the guide device 4 and the bearing device 6, and the control unit 3a comes to rest between them in the operating state when it is resting on the section that is in the form of a plate. At least one of the two reinforcements is designed such that it forms a reinforcing corner 7 which, as illustrated in FIG. 1, merges into the locking tongue 80b which is arranged on the corresponding side. The side which points towards the interior of the motor vehicle is preferably formed with a reinforcing corner 7 in order to make it possible to absorb the acceleration forces which occur when the doors are shut. The reinforcing corner 7 is thus used to provide additional position security for the control unit 3a.

A printed circuit board tongue 31 also projects from the control unit 3a in the direction of the drive unit 2, and a Hall sensor 37, a single-chip micro controller or the like, for example, is arranged on it.

Plug contacts or electrical contact tongues 30a, 30b or the like for providing power to the commutator motor 20 are fitted on the side of the control unit 3a facing the bearing device and project from the control unit 3a, parallel to the printed circuit board tongue 31, in the direction of the drive unit 2. The electrical connection between the control unit 3a and the motor drive unit 2 is made via the electrical contact tongues 30a, 30b. The plug contacts 30a, 30b and the printed circuit board tongue 31 are passed through the cut-out 5, which passes all the way through, between the interface apparatus 1 and the drive unit 2 into the drive unit 2.

The control unit 3a preferably comprises two housing shells 37, 38 with a laterally projecting latching tooth 32a, or 32b, respectively, preferably being provided on the respective housing shell 37, 38 and engaging in a correspondingly associated latching opening 81a or 81b, respectively, in the latching device or locking tongue 80a, 80b, respectively, when the control unit 3a is in the operating state.

Figure 2:
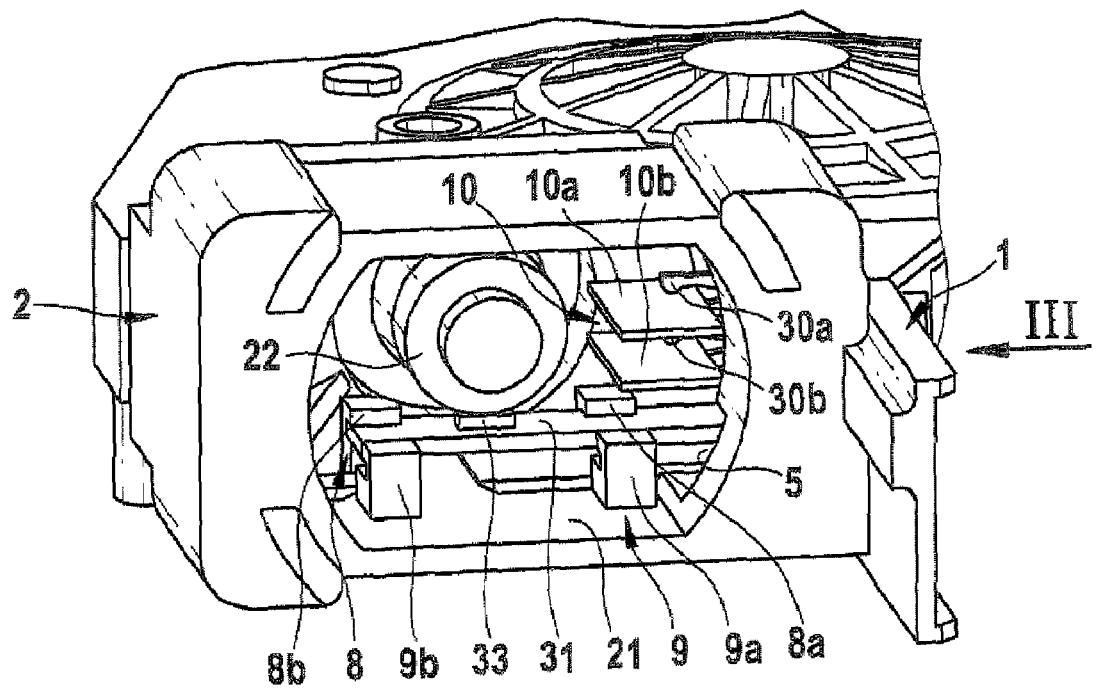
FIG. 2 shows a perspective front view of the interior of a drive unit with an interface apparatus fitted, according to one exemplary embodiment of the present invention.

FIG. 2 shows a perspective view of the drive unit 2 with an interface apparatus 1 fitted, as already explained above but without the associated commutator motor.

As can be seen from FIG. 2, the printed circuit board tongue 31 of the control unit 3a in the illustrated embodiment has a Hall sensor 33 mounted on it and is passed through the cut-out 5 into the interior of the drive unit 2. In this case, the printed circuit board tongue 31 is passed through preferably two guide elements 8a, 8b in an operating state such that the Hall sensor 33 assumes a predetermined position with respect to the ring magnet 22.

The two guide elements 8a, 8b are arranged one behind the other parallel to the holding direction of the printed circuit board and have the same guide height $h_1$. The guide elements 8a, 8b are advantageously formed integrally on the brush holder 21 of the commutator motor which is provided in the drive unit 2, or are formed as part of the housing of the drive unit 2. The guide elements 8a, 8b are preferably in the form of an interlocking positive guide, with the printed circuit board tongue 31 to be inserted being guided, for example, in a groove in the respective guide element. Alternatively, the guide can also be provided by means of a contact guide or a sprung rest surface guide, with the printed circuit board tongue 31 preferably being prestressed in a sprung manner against the corresponding resting surfaces of the rigidly fitted guide elements 8a, 8b and 9a, 9b.

Two motor contacts 10a, 10b in the form of contact plates are also provided close to the cut-out 5 in the drive unit 2 and are used on the one hand for guiding the plug contacts 30a, 30b of the control unit 3a, and on the other hand, by being clamped onto the plug contacts 30a, 30b, for providing electrical power to the drive unit 2.

Figure 3:
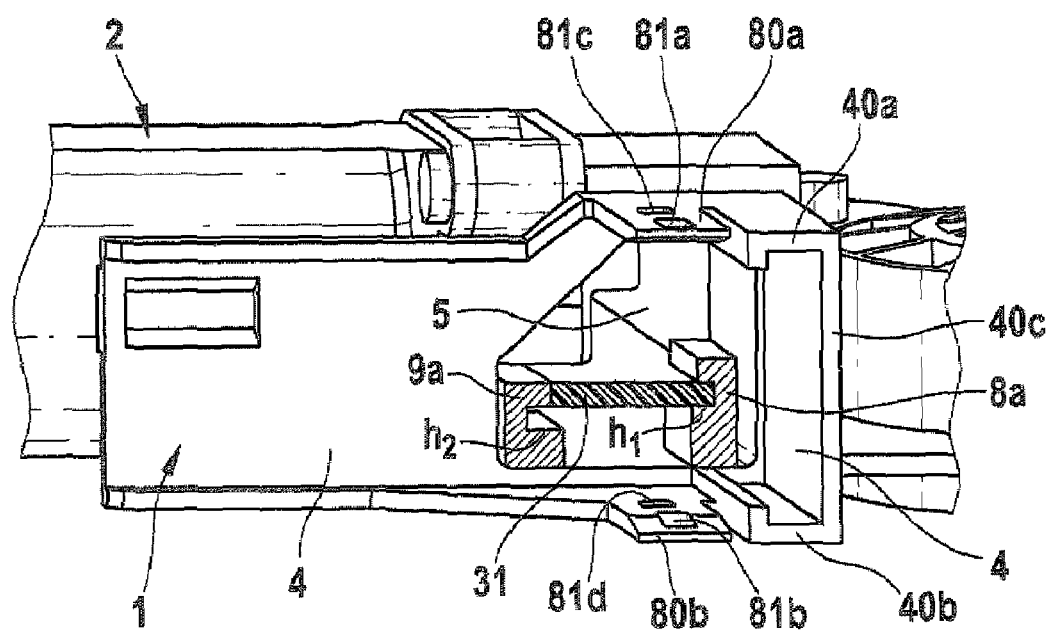
FIG. 3 shows a perspective side view of the drive unit in the direction of the arrow shown in FIG. 2, with a printed circuit board section inserted.

FIG. 3 shows a view in the direction of the arrow shown in FIG. 2. However, the housing of the drive unit 3a is not shown, in order to illustrate the guide elements 8a and 9a better, and the printed circuit board tongue 31 is illustrated only partially.

If FIG. 3 is compared with FIG. 2, it can be seen that the guide element pairs 8a, 8b and 9a, 9b are designed to have two different guide heights $h_1$ and $h_2$, respectively. The two pairs of guide elements 8a, 8b and 9a, 9b with the different guide heights $h_1$ and $h_2$, respectively, are arranged opposite one another in the drive unit 2 such that they correspond to the respectively inserted printed circuit board tongue 31. A respective pair of guide elements 8a, 8b and 9a, 9b is associated with a specific control unit 3a with a different position of the printed circuit board tongue 31.

The control unit 3a to be inserted and as shown in FIGS. 2 and 3 has a printed circuit board tongue 31 with a Hall sensor 33 mounted on it, with the predetermined operating position of the Hall sensor 33 with respect to the ring magnet 22 of the drive unit 2 governing the arrangement of the guide elements 8a, 8b. The number of the guide elements 8a, 8b and 9a, 9b, respectively, and of the guide devices 8, 9 may vary depending on the requirement.

Figure 4:
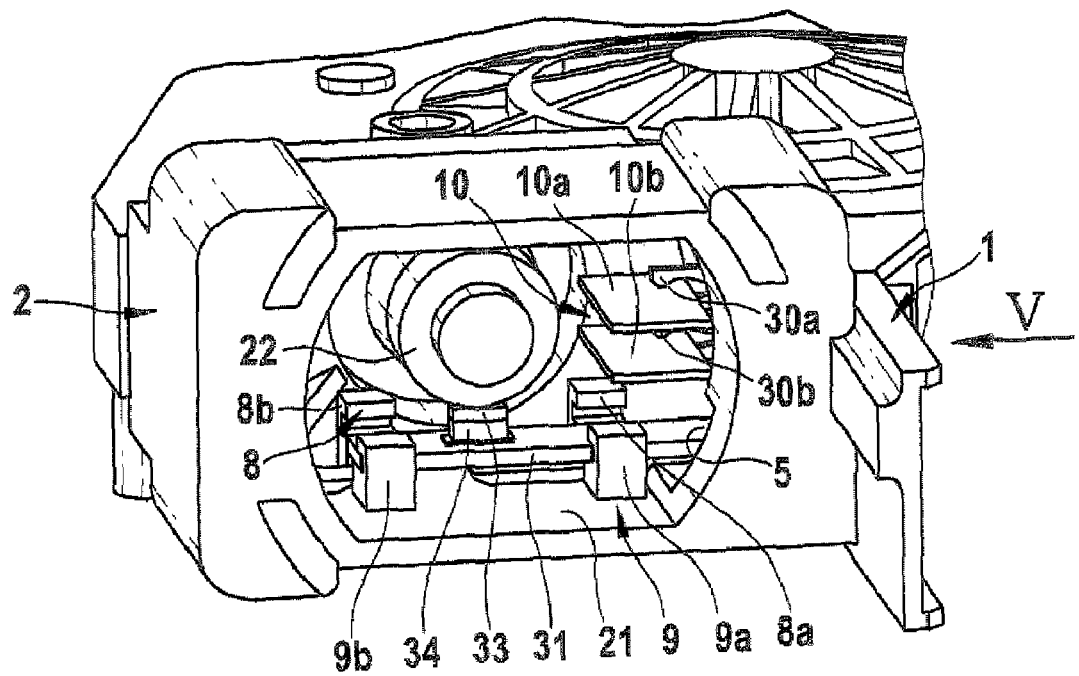
FIG. 4 shows a perspective front view of the interior of a drive unit with an interface apparatus fitted, according to one exemplary embodiment of the present invention.
Figure 5:
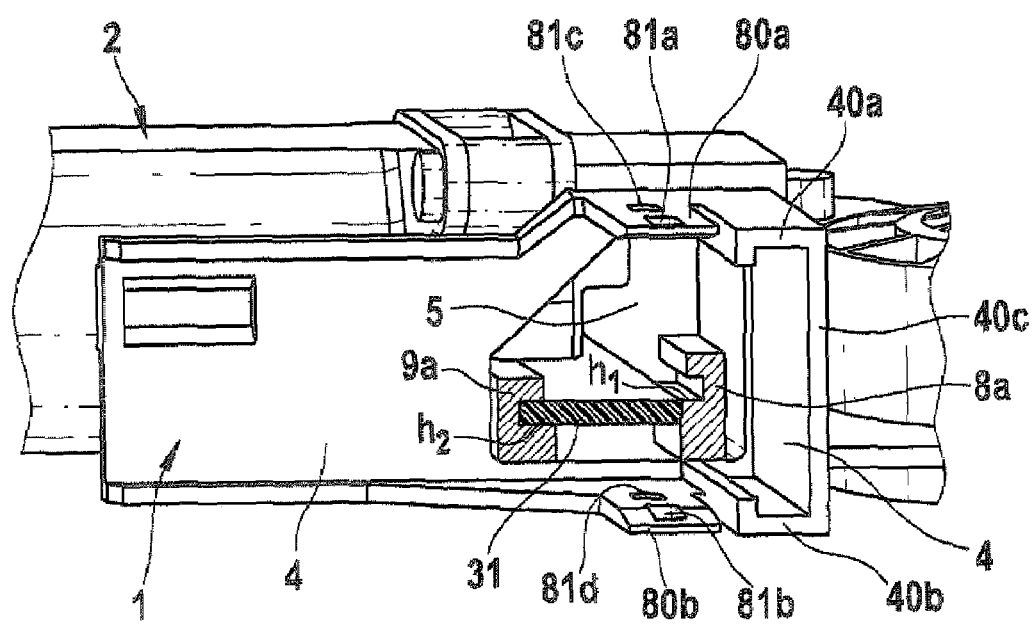
FIG. 5 shows a perspective side view of the drive unit in the direction of the arrow shown in FIG. 4, with a printed circuit board section inserted.

FIGS. 4 and 5 correspond essentially to the views in FIGS. 2 and 3, but with the only difference being that the control unit 3a has a printed circuit board tongue 31 on which a single-chip micro controller 34 with an integrated Hall sensor 33 is mounted, rather than the Hall sensor 33. Since the operating position of the Hall sensor 33 with respect to the ring magnet 22 is predetermined and must therefore correspond to the position in FIG. 2 or FIG. 3, respectively, but the single-chip micro controller 34 means that an additional component is provided between the printed circuit board finger 31 and the Hall sensor 33, the guide elements 9a and 9b which are associated with this control unit 3a have a smaller guide height $h_2$, as can be seen in FIG. 5. This makes it possible to compensate for the height differences between the various electronic devices, which are distinguished solely by the mechanical interface.

The other components and functions correspond to those in the arrangement shown in FIG. 2 or FIG. 3 and therefore do not need to be explained any further.

On the basis of the normal situation of an electronic control drive unit 2 for, for example, an adjustment device, it is necessary for a small number of applications to provide a purely electrical drive without any electronics.

Figure 6:
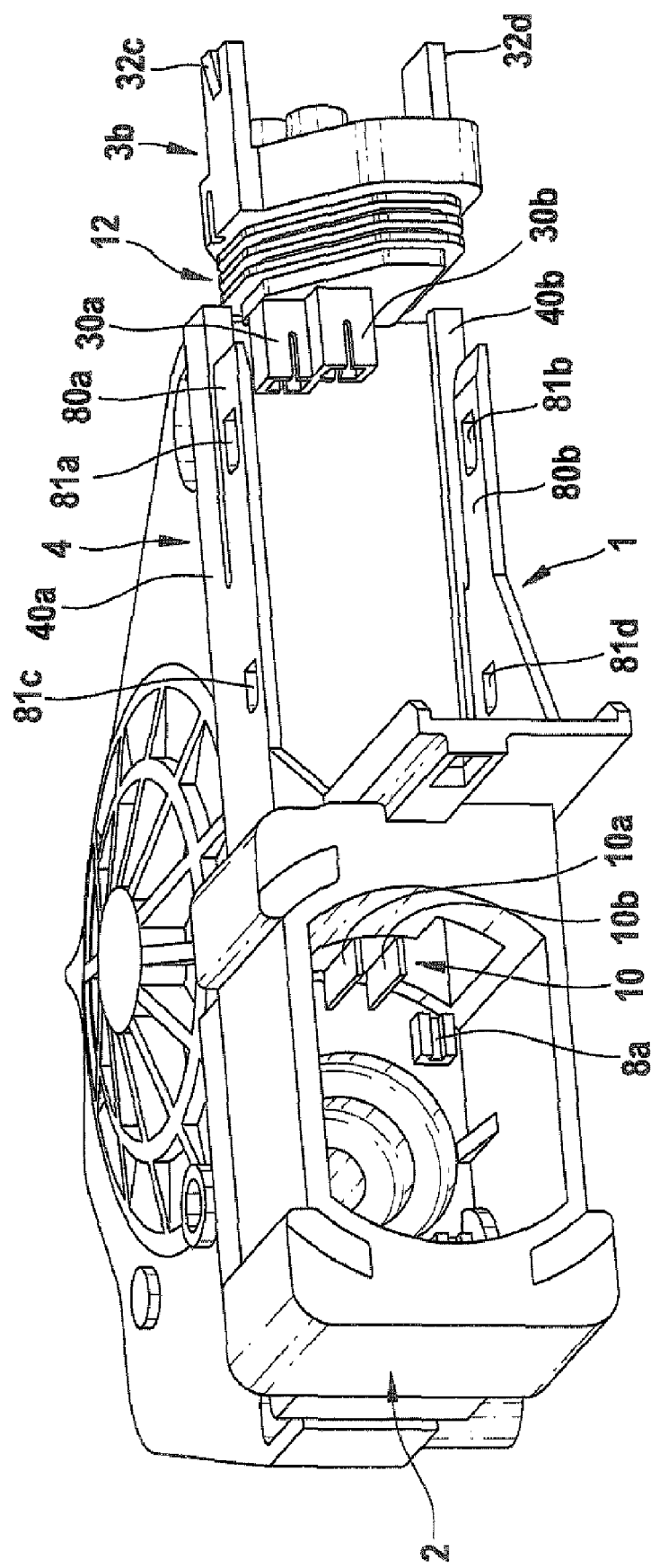
FIG. 6 shows a perspective view of the drive unit without an integrated motor but with an interface apparatus fitted and a partially inserted plug apparatus, according to one exemplary embodiment of the present invention.
Figure 7:
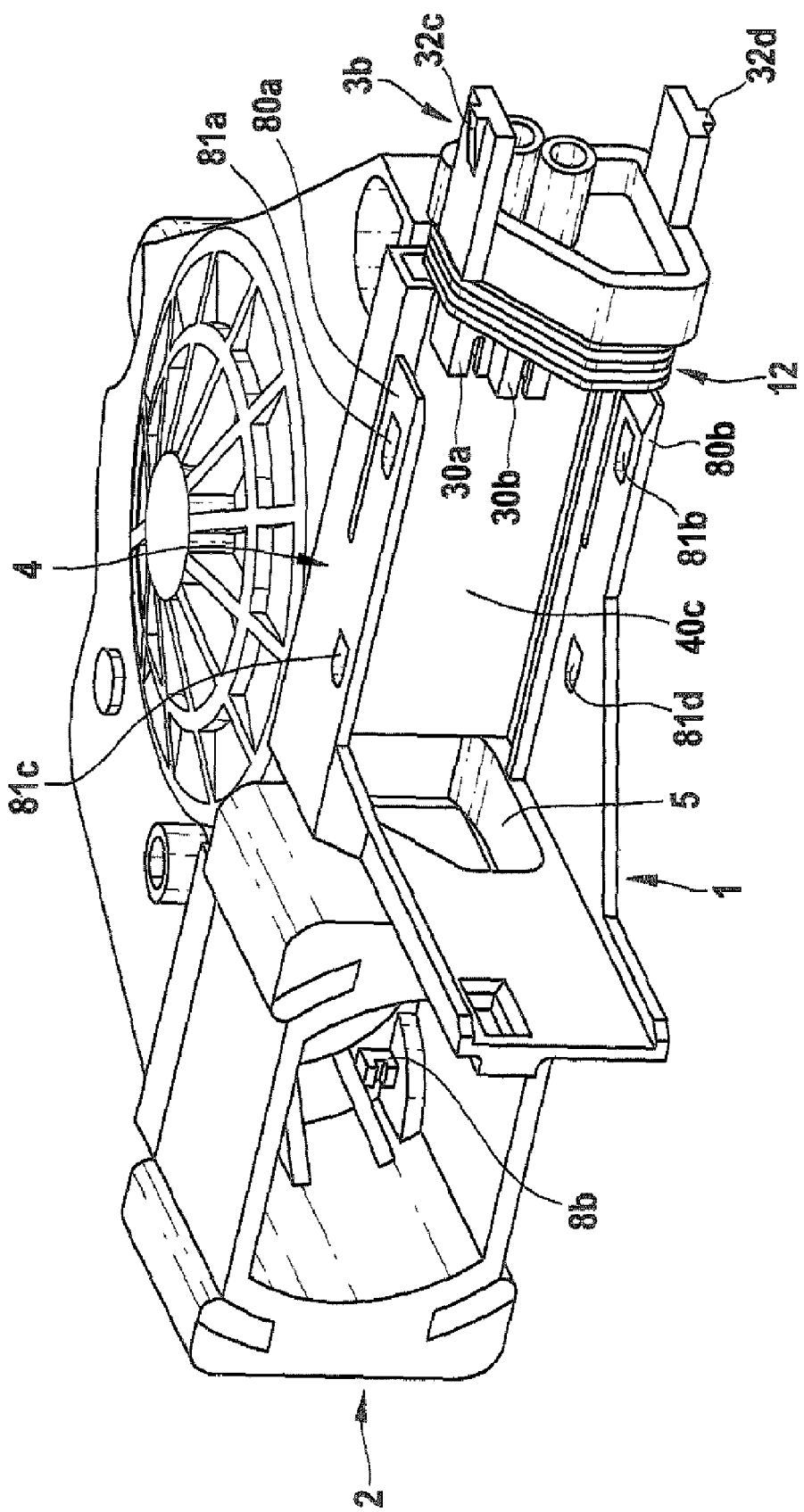
FIG. 7 shows a further perspective view of the arrangement shown in FIG. 6.

As is illustrated in perspective form in FIGS. 6 and 7, a plug unit 3b is in this exemplary embodiment of the invention connected via the interface apparatus 1 to the drive unit 2 in such a way that electrical plug contacts 30a, 30b of the plug unit 3b are plugged onto the contact boards 10a, 10b of the drive unit 2 in the operating state, and are guided by them.

In this case, latching teeth 32c and 32d which project laterally on the plug unit 3b engage in the corresponding associated latching openings 81c, 81d, respectively, in the latching device and locking tongues 80a and 80b, respectively, when the plug unit 3b is in the operating state.

In order to ensure that the electrical contact points 10 in the interior of the drive unit 2 are protected, for example against dirt particles or moisture, the side of the plug unit 3b which faces the drive unit 2 is designed such that it forms an interlock with the cut-out 5. In addition, a multistage laminate seal 12 is provided between the cut-out 5 and the housing of the plug unit 3b, in order to seal the arrangement in the operating state. The arrangement can thus also be used in the wet area of a vehicle door without malfunctions being caused by moisture.

The present invention therefore provides a simple and low-cost interface apparatus 1 in order to implement the building block principle. Differently designed control and plug units 3a, 3b may be connected to the same drive unit 2. The control or plug unit for the respective application will thus be designed appropriately with a sensor system; electronics for controlling a window winder, a seat, a sliding roof, an external mirror or the like; with suppression components, such as an inductor or a capacitor; electronics as multifunctional electronics, or the like. For each control unit/plug unit, precise and secure positioning of the corresponding components in the operating state is ensured by means of the guide devices which are designed such that they differ in an appropriate manner.

Although the present invention has been described above on the basis of preferred exemplary embodiments, it is not restricted to these exemplary embodiments but can be modified in a wide range of manners.

In particular, the holding section 31 of the control or plug unit may be in the form of a finger or tongue 31 on a printed circuit board, a stamped grid, a lead frame, a part of an MID base, or the like.

Furthermore, the sealing devices may also be arranged between that section of the control unit which faces the drive unit and the interface apparatus.

The invention claimed is:

1. A mechanical interface apparatus for a motor drive unit in motor vehicles, in particular in a motor vehicle door, which is firmly connected to the drive unit and comprises holding/guide devices for holding a connection unit, wherein a continuous cut-out, for leading at least one plug contact, one component mount or the like of the connection unit therethrough is formed between the interface apparatus and the drive unit;
wherein at least two guide devices are provided in or close to the drive unit for guiding the plug contacts, component mounts or the like of different connection units;
wherein said at least two guide devices each comprises at least one guide element, such that the guide elements are displaced parallel to each other for providing different guide heights for the plug contacts, component mounts or the like of said different connection units.

2. The interface apparatus as claimed in claim 1, wherein at least one of said guide devices is formed by a part of the housing of the drive unit.

3. The interface apparatus as claimed in claim 1, wherein at least one of said guide devices is formed by the brush holder of a commutator motor which is provided in the drive unit.

4. The interface apparatus as claimed in claim 1, characterized in that said guide devices are rigid.

5. The interface apparatus as claimed in claim 1, characterized in that said guide elements are provided within the drive unit.

6. The interface apparatus as claimed in claim 1, wherein said component mount of the connection unit for carrying components comprises a finger of a printed circuit board, stamped grid, lead frame or part of a MID base.

7. The interface apparatus as claimed in claim 1, wherein the component mount is flexible.

8. The interface apparatus as claimed in claim 1, wherein said connection unit engages in an interlocking manner with said cut-out in the operating state.

9. The interface apparatus as claimed in claim 1, wherein at least one of said guide devices is at least partially formed by motor contacts which are provided in said drive unit.

10. A mechanical interface apparatus for a motor drive unit in motor vehicles, in particular in a motor vehicle door, which is firmly connected to the drive unit and comprises holding/guide devices for holding a connection unity wherein a continuous cut-out for leading at least one plug contact, one component mount or the like of the connection unit therethough is formed between the interface apparatus and the drive unit;
wherein at least two guide devices are provided in or close to the drive unit for guiding the plug contacts, component mounts or the like of different connection units;
wherein said at least two guide devices comprise at least one guide element, such that the guide elements are displaced parallel to each other for providing different guide heights for the plug contacts, component mounts or the like of said different connection units;
wherein said guide elements are provided within the drive unit; and
wherein said guide elements are each arranged in pairs parallel to the holding direction, with the pairs of guide elements having different guide heights.

11. A mechanical interface apparatus for a motor drive unit in motor vehicles, in particular in a motor vehicle door, which is firmly connected to the drive unit and comprises holding/guide devices for holding a connection unit, wherein a continuous cut-out, for leading at least one plug contact, one component mount or the like of the connection unit therethrough is formed between the interface apparatus and the drive unit;
wherein at least two guide devices are provided in or close to the drive unit for guiding the plug contacts, component mounts or the like of different connection units;
wherein said at least two guide devices comprise at least one guide element such that the guide elements are displaced parallel to each other for providing different guide heights for the plug contacts, component mounts or the like of said different connection units;
wherein said component mount of the connection unit for carrying components comprises a finger of a printed circuit board, stamped grid, lead frame or part of a MID base; and wherein said guide device is rigid and provided for moving said components on the component mount for the connection unit to a predetermined, stable operating position.

12. A mechanical interface apparatus for a motor drive unit in motor vehicles, in particular in a motor vehicle door, which is firmly connected to the drive unit and comprises holding/guide devices for holding a connection unit, wherein a continuous cut-out for leading at least one plug contact, one component mount or the like of the connection unit therethrougt is formed between the interface apparatus and the drive unit;
 wherein at least two guide devices are provided in or close to the drive unit for guiding the plug contacts, component mounts or the like of different connection units;
 wherein said at least two guide devices comprise at least one guide element such that the guide elements are displaced parallel to each other for providing different guide heights for the plug contacts, component mounts or the like of said different connection units;
 wherein at least one sealing device, having the form of a sealing ring or a multistage laminate seal, is provided between said cut-out and the housing of the connection unit.

13. A mechanical interface apparatus for a motor drive unit in motor vehicles, in particular in a motor vehicle door, which is firmly connected to the drive unit and comprises holding/guide devices for holding a connection unit, wherein a continuous cut-out for leading at least one plug contact, one component mount or the like of the connection unit therethrough is formed between the interface apparatus and the drive unit;
 wherein at least two guide devices are provided in or close to the drive unit for guiding the plug contacts, component mounts or the like of different connection units;
 wherein said at least two guide devices comprise at least one guide element such that the guide elements are displaced parallel to each other for providing different guide heights for the plug contacts, component mounts or the like of said different connection units;
 wherein said component mount for the connection unit for carrying components comprises a finger of a printed circuit board, stamped grid, lead frame or part of a MID base; and
 wherein said components comprise a sensor.

14. A mechanical interface apparatus for a motor drive unit in motor vehicles, in particular in a motor vehicle door, which is firmly connected to the drive unit and comprises holding/guide devices for holding a connection unit, wherein a continuous cut-out for leading at least one plug contact, one component mount or the like of the connection unit therethrough is formed between the interface apparatus and the drive unit;
 wherein at least two guide devices are provided in or close to the drive unit for guiding the plug contacts, component mounts or the like of different connection units;
 wherein said at least two guide devices comprise at least one guide element such that the guide elements are displaced parallel to each other for providing different guide heights for the plug contacts, component mounts or the like of said different connection units;
 wherein said component mount for the connection unit for carrying components comprises a finger of a printed circuit board, stamped grid, lead frame or part of a MID base; and
 wherein said components comprise an electronic circuit with an integrated sensor.

15. A mechanical interface apparatus for a motor drive unit in motor vehicles, in particular in a motor vehicle door, which is firmly connected to the drive unit and comprises holding/guide devices for holding a connection unit, wherein a continuous cut-out for leading at least one plug contact, one component mount or the like of the connection unit therethrough is formed between the interface apparatus and the drive unit;
 wherein at least two guide devices are provided in or close to the drive unit for guiding the plug contacts, component mounts or the like of different connection units; and
 wherein said at least two guide devices comprise at least one guide element such that the guide element are displaced parallel to each other for providing different guide heights for the plug contacts, component mounts or the like of said different connection units;
 wherein said component mount for the connection unit for carrying components comprises a finger of a printed circuit board, stamped grid, lead frame or part of a MID base; and
 wherein said components comprise a suppressor.

* * * * *